(12) United States Patent
Nakajima et al.

(10) Patent No.: US 10,303,046 B2
(45) Date of Patent: May 28, 2019

(54) PROJECTOR WITH HERMETIC HOUSING AND AIR GUIDE WALL THEREIN

(71) Applicant: Panasonic Intellectual Property Management Co., Ltd., Osaka (JP)

(72) Inventors: Yoshinobu Nakajima, Kyoto (JP); Masato Tanaka, Kyoto (JP); Kento Ishimuro, Osaka (JP); Kazunori Tanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/967,993

(22) Filed: May 1, 2018

(65) Prior Publication Data

US 2018/0348612 A1    Dec. 6, 2018

(30) Foreign Application Priority Data

Jun. 1, 2017  (JP) ................................. 2017-109324

(51) Int. Cl.
*G03B 21/16*    (2006.01)
*G03B 21/14*    (2006.01)

(52) U.S. Cl.
CPC ........... *G03B 21/16* (2013.01); *G03B 21/145* (2013.01)

(58) Field of Classification Search
CPC ...... G03B 21/14; G03B 21/16; G03B 21/145; H04N 9/3105; H04N 9/3141; H04N 9/3144

See application file for complete search history.

(56) References Cited

U.S. PATENT DOCUMENTS

| 6,443,575 | B1 | 9/2002 | Miyamoto et al. |
| 7,841,721 | B2 | 11/2010 | Momose et al. |
| 9,904,155 | B2 * | 2/2018 | Zakoji ................... F21V 29/673 |
| 2004/0233548 | A1 * | 11/2004 | Uehara ................ H04N 9/3105 |
| | | | 359/819 |

(Continued)

FOREIGN PATENT DOCUMENTS

| JP | 2001-133885 | 5/2001 |
| JP | 2005-234275 | 9/2005 |

(Continued)

*Primary Examiner* — Sultan Chowdhury
(74) *Attorney, Agent, or Firm* — Wenderoth, Lind & Ponack, L.L.P.

(57) ABSTRACT

A projector includes a light modulation device; a projection lens; a hermetic housing; a projector housing containing the hermetic housing; a heat exchanger; an air guide wall being located in the hermetic housing and partitioning the air guide passage from a main space containing the light modulation device, the air guide wall including: a communication part adjoining the heat exchanger and providing communication between the air guide passage and the main space, and an opening functioning as an inlet for guiding air from the main space into the air guide passage after the air has passed through the heat exchanger; and a fan located at the inlet so as to introduce the air in the main space into the air guide passage, to guide the air in the air guide passage to the communication part, and to blow the air from the communication part to the heat exchanger.

10 Claims, 11 Drawing Sheets

(56) References Cited

U.S. PATENT DOCUMENTS

| | | | | |
|---|---|---|---|---|
| 2005/0220156 A1* | 10/2005 | Kitabayashi | ...... | G02F 1/133385 |
| | | | | 372/35 |
| 2007/0024814 A1* | 2/2007 | Woo | ...... | G03B 21/16 |
| | | | | 353/52 |
| 2009/0290131 A1* | 11/2009 | Kim | ...... | G03B 21/16 |
| | | | | 353/61 |
| 2014/0300871 A1* | 10/2014 | Yanagisawa | ...... | F25B 21/02 |
| | | | | 353/54 |
| 2016/0299414 A1 | 10/2016 | Usuda et al. | | |

FOREIGN PATENT DOCUMENTS

| JP | 2016-200654 | 12/2016 |
|---|---|---|
| JP | 2016-218383 | 12/2016 |

\* cited by examiner

PROJECTOR WITH HERMETIC HOUSING AND AIR GUIDE WALL THEREIN

BACKGROUND

1. Technical Field

The present disclosure relates to a projector.

2. Description of Related Art

Projectors have been used in concert venues, outdoor facilities, and other various locations. Such projectors are expected to be protected from dust so as to prevent image degradation even when used in large spaces. For example, Japanese Unexamined Patent Application Publication No. 2016-218383 discloses a projector shielded from dust by housing a light modulation device in a hermetic housing.

When the light modulation device is housed in the hermetic housing, the heat generated by the light modulation device may be trapped in the housing, thereby having harmful effects. To avoid this problem, the above-mentioned patent literature circulates the air inside the hermetic housing using a circulation fan, thereby cooling and radiating the light modulation device. However, this patent literature has not made a detailed analysis of air circulation channels, and thus has room for improvement in radiation performance.

The present disclosure provides a projector that is dust-proof and has better radiation performance.

SUMMARY

The projector according to the present disclosure includes a light modulation device, a projection lens, a hermetic housing, a projector housing, a heat absorption part, an air guide wall, and a first sirocco fan. The projection lens is configured to project light received from the light modulation device. The hermetic housing hermetically houses the light modulation device. The projector housing contains the hermetic housing. The heat absorption part is located at the upper section of the hermetic housing and is configured to absorb heat from the hermetic housing and to radiate the heat to the outside of the hermetic housing. The air guide wall is located in the hermetic housing and partitions an air guide passage, which extends along the bottom surface of the hermetic housing, from a main space containing the light modulation device. The air guide wall includes a communication part and an opening. The communication part adjoins the heat absorption part and provides communication between the air guide passage and the main space. The opening functions as an inlet for guiding air from the main space into the air guide passage after the air has passed through the heat absorption part. The first sirocco fan is located at the inlet and is configured to introduce the air in the main space into the air guide passage, to guide the air in the air guide passage to the communication part, and to blow the air from the communication part to the heat absorption part.

According to the present disclosure, the projector is rendered dust-proof by housing the light modulation device in the hermetic housing. The projector also has better radiation performance by locating the air guide passage along the bottom surface of the hermetic housing so as to achieve more efficient heat release from the bottom surface of the hermetic housing.

DETAILED DESCRIPTION

An embodiment will now be described in detail with reference to the accompanying drawings whenever necessary. However, unnecessarily detailed descriptions may be omitted. For example, well-known matter and substantially the same configuration as described earlier may not be described repeatedly to avoid redundancy and to help those skilled in the art understand them easily. The inventors have provided the accompanying drawings and the following description to make those skilled in the art fully understand the present disclosure, and do not intend to limit the claimed subject matter.

First Exemplary Embodiment

1. Structure

Figure 1:
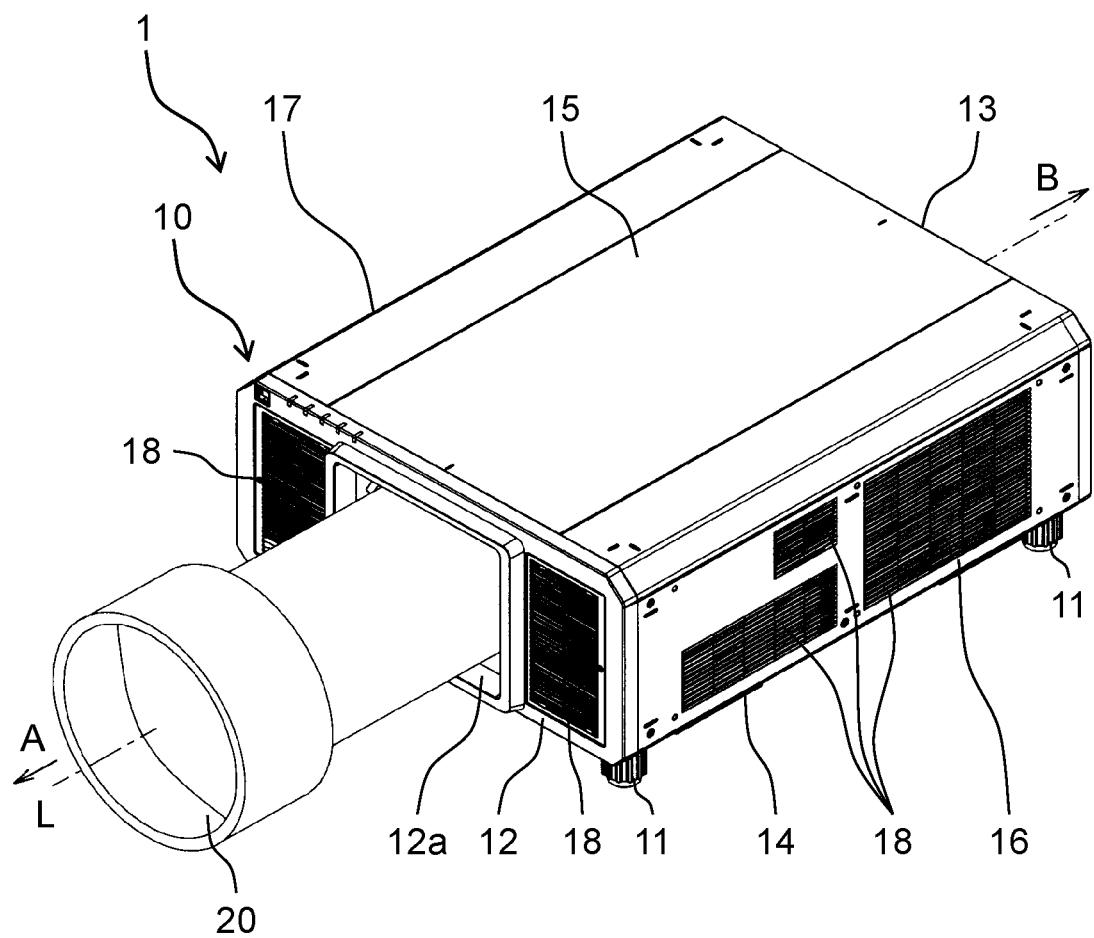
FIG. 1 is an external perspective view of a projector according to an embodiment of the present disclosure.

FIG. 1 is an external perspective view of projector 1 according to an embodiment of the present disclosure. Projector 1 forms an optical image by modulating the light beams emitted from an internal light source based on image information, and projects the formed optical image on a screen in an enlarged scale. Projector 1 includes substantially rectangular parallelepiped projector housing 10 and projection lens 20 exposed from projector housing 10. Projector housing 10 has a bottom surface with substantially columnar legs 11 at its four corners. Projector 1 stands on legs 11. Projection lens 20 has an optical axis L, and for convenience of explanation, the direction (arrow A) in which light is projected is referred to as the front, and the opposite direction (arrow B) is referred to as the back.

Projection lens 20, which consists of a set of lenses housed in a lens barrel, projects an optical image in an enlarged scale. The optical image is modulated based on the image information by the body of projector 1. In the present embodiment, projection lens 20 is detachable from projector housing 10. Lens 20 can be replaced to change the magnification factor depending on the purpose of use.

Projector housing 10 includes front panel 12 with hole 12a to pass projection lens 20, and rear panel 13 on the opposite side of housing 10 from front panel 12. Housing 10 further includes lower panel 14 having four legs 11 (two of which are shown), upper panel 15 on the opposite side of housing 10 from lower panel 14, and two side panels 16 and 17 coupling lower panel 14 and upper panel 15 together. These panels 12-17, all of which are made of synthetic resin, are combined as shown in the drawings and screwed together to form rectangular parallelepiped housing 10. Housing 10 has as a characteristic a plurality of cooling holes 18 through which the heat in housing 10 can be released outside.

Figure 2:
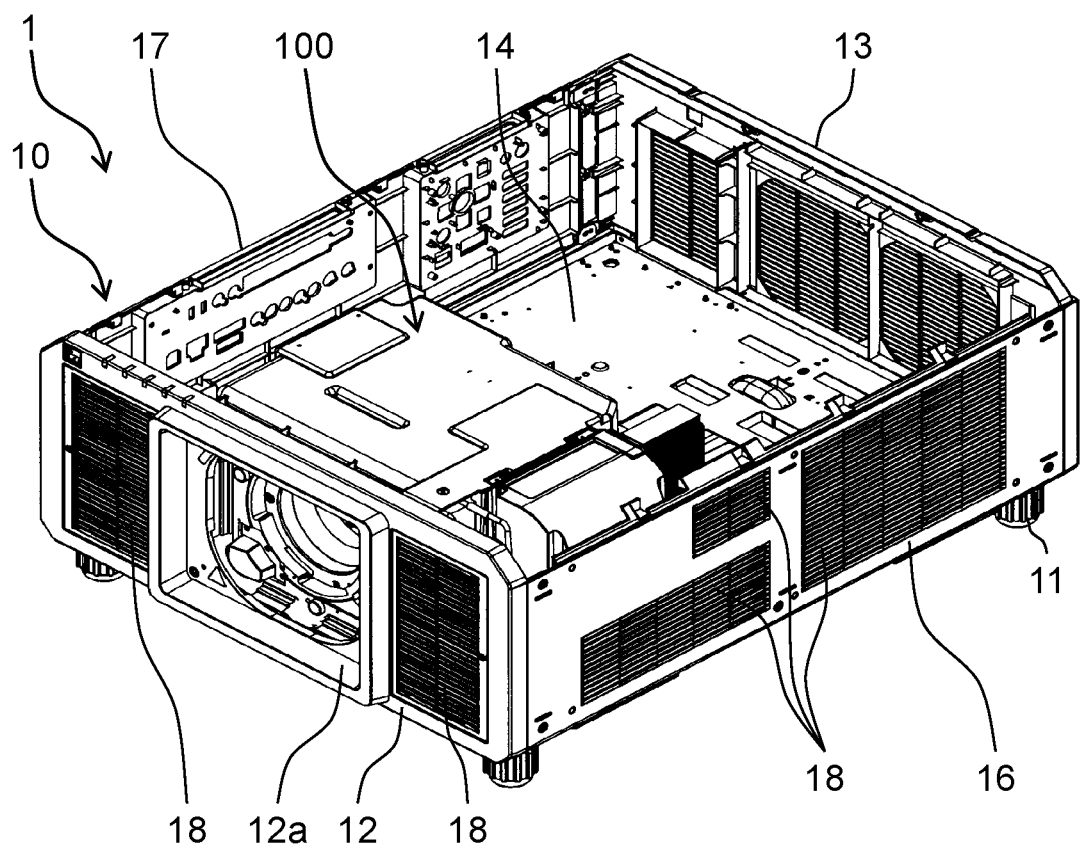
FIG. 2 is an internal perspective view of the projector housing shown in FIG. 1.

FIG. 2 is an internal perspective view of projector housing 10 shown in FIG. 1. In FIG. 2, upper panel 15 and projection lens 20 have been removed from projector 1. Projector housing 10 contains optical unit 100 mechanically coupled with projection lens 20, a light source unit (not shown) for supplying light to optical unit 100, a power supply unit (not shown) for suppling power to optical unit 100 and the light source unit, and control device 30 (see FIG. 10) for taking control of these components.

Figure 3:
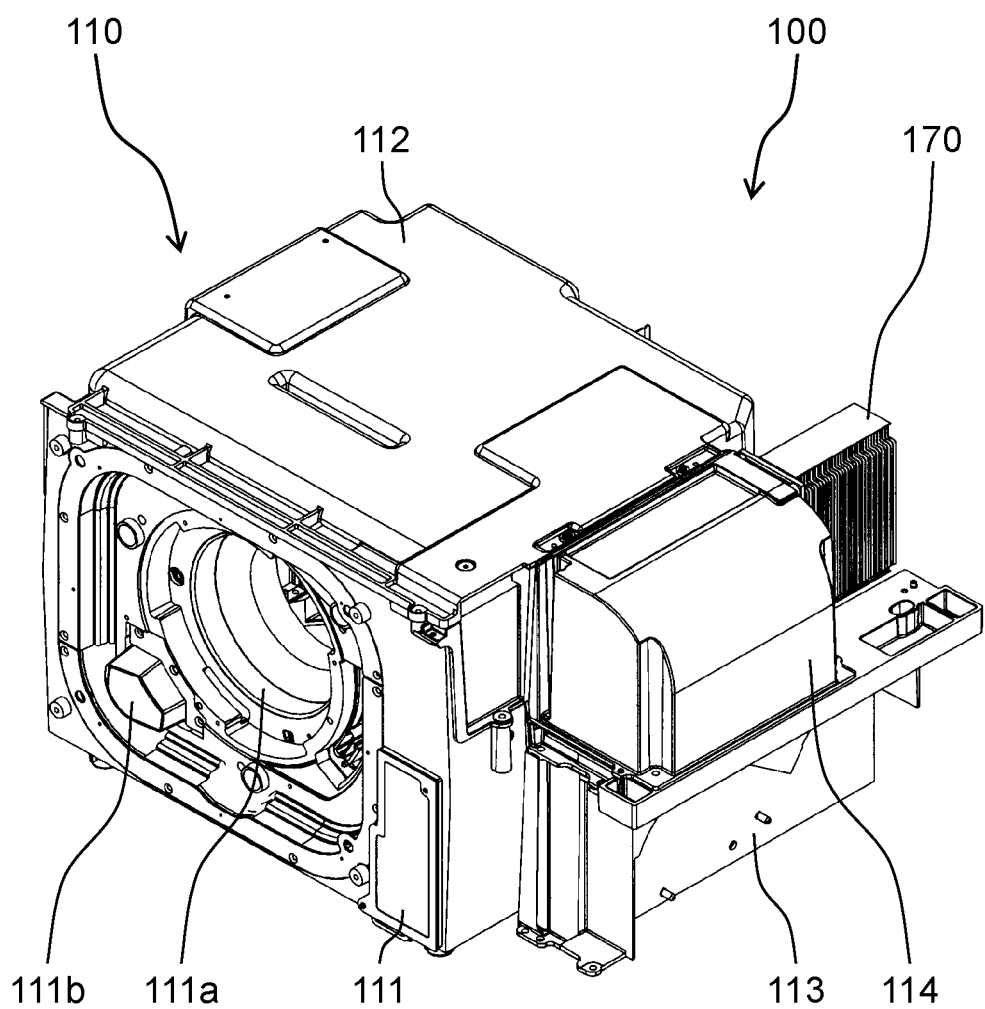
FIG. 3 is a perspective view of the optical unit shown in FIG. 2.

FIG. 3 is a perspective view of optical unit 100 shown in FIG. 2. Optical unit 100 is sealed with hermetic housing 110. Housing 110, which is substantially rectangular parallelepiped, includes bottom mount case 111, top mount case 112, fan case 113, and heat exchanger case 114.

Bottom mount case 111 contains main optical components of optical unit 100 and also forms the front face of optical unit 100. The front face has circular lens-mounting hole 111a into which projection lens 20 (see FIG. 1) is inserted. When inserted in hole 111a, lens 20 completely closes hole 111a, allowing hermetic housing 110 to be a sealed space. The front face also has, near lens-mounting hole 111a, button 111b for removing lens 20. The user can press button 111b to easily remove lens 20 from optical unit 100.

Top mount case 112 is assembled above bottom mount case 111 and forms the lid of bottom mount case 111.

Fan case 113 is assembled on the lateral side of bottom mount case 111 so as to house sirocco fans 160 and 161 (see FIG. 8), which will be described later.

Heat exchanger case 114 is assembled above fan case 113 and on the lateral side of top mount case 112 so as to house heat exchanger 170.

Fan case 113 and heat exchanger case 114 define the air circulation channel. To be more specific, the internal space of fan case 113 and heat exchanger case 114 is fluidically communicated with the space defined by bottom mount case 111 and top mount case 112. The bottom of each of bottom mount case 111 and fan case 113 has an opening. As shown in FIG. 2, when optical unit 100 is placed on lower panel 14, these openings are closed by lower panel 14. In other words, projector housing 10 and hermetic housing 110 share the bottom surface.

Figure 4:
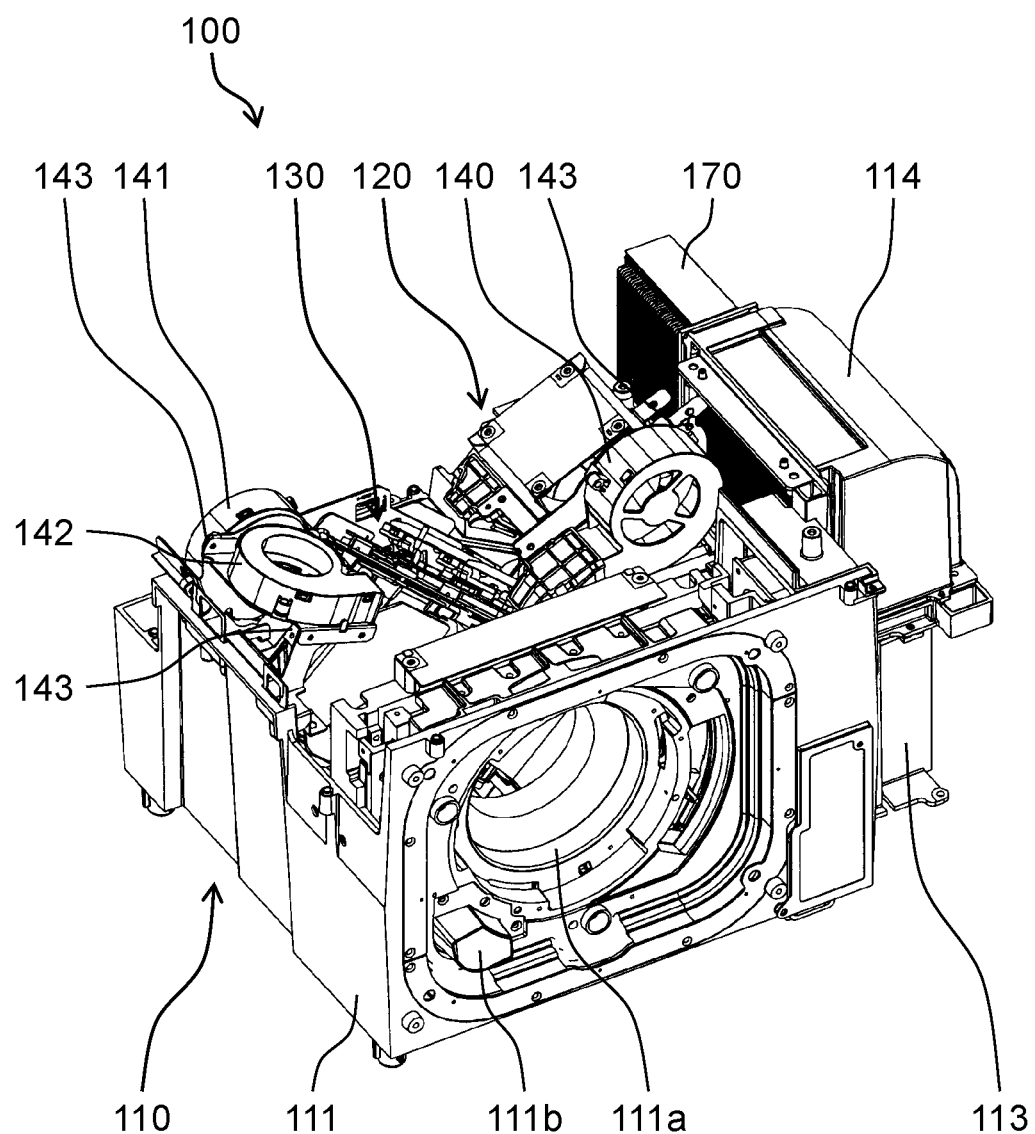
FIG. 4 is a first internal perspective view of the hermetic housing shown in FIG. 2.
Figure 5:
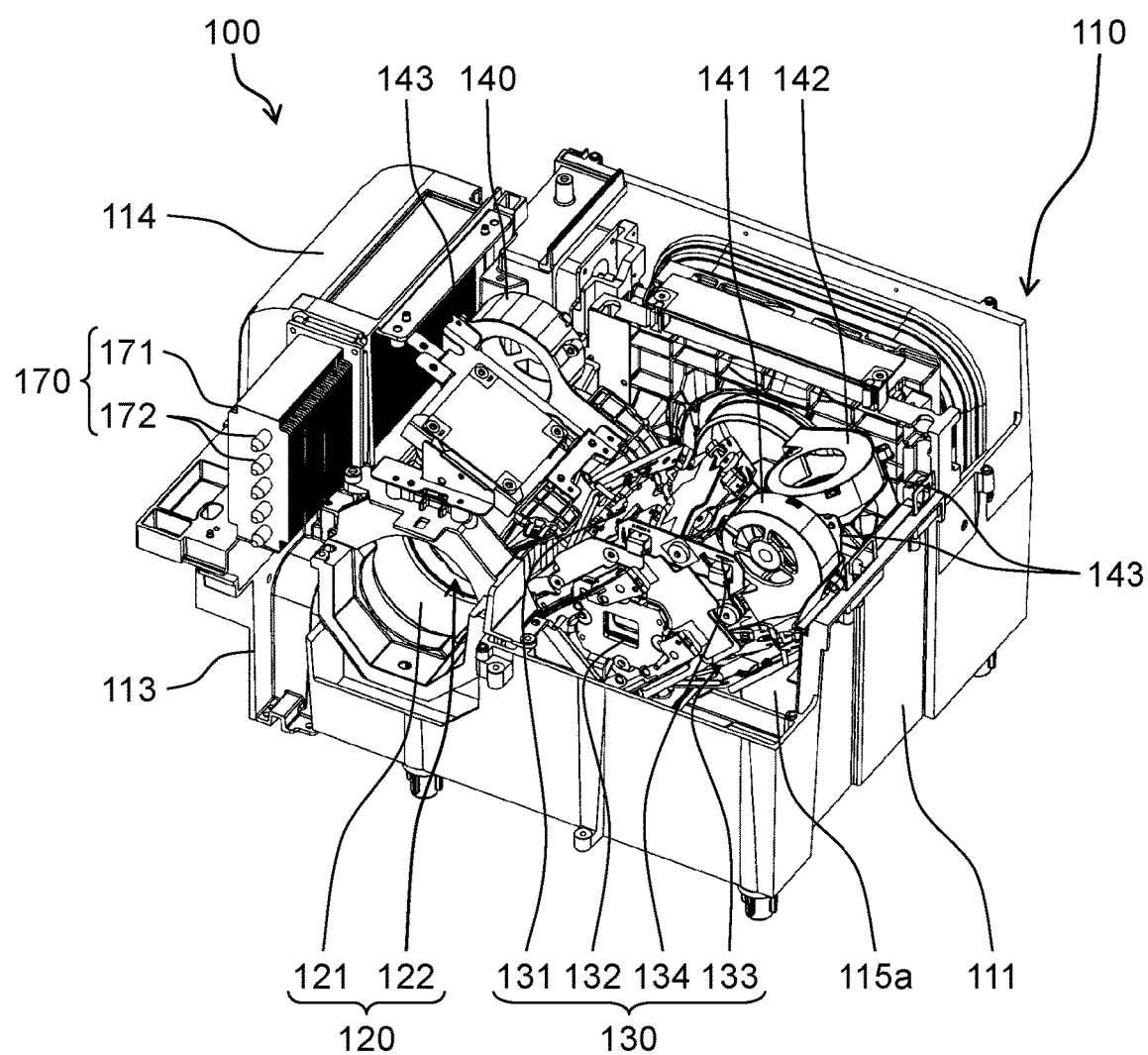
FIG. 5 is a second internal perspective view of the hermetic housing shown in FIG. 2.

FIGS. 4 and 5 are internal perspective views of hermetic housing 110 shown in FIG. 2. To be more specific, FIG. 4 is an internal perspective view of hermetic housing 110 seen from the front after top mount case 112 is detached. FIG. 5 is an internal perspective view of hermetic housing 110 seen from the back after top mount case 112 is detached. As seen in FIGS. 4 and 5, bottom mount case 111 contains light-incident part 120, light modulation device 130, and sirocco fans (third sirocco fans) 140-142. Light modulation device 130 includes digital mirror devices (DMDs), which are light modulation devices based on digital light processing (DLP) (registered trademark) technology. In the present embodiment, the light modulation is based on DLP technology. The optical mechanism of DLP projectors is well known so that its detailed description and illustration may be omitted in the following description.

Light-incident part 120 guides the light from the light source unit (not shown) to light modulation device 130.

Light-incident part 120 includes light collection part 121 having an opening with a lens for collecting the light from the light source unit (not shown), and light guide part 122 composed of a lens barrel, mirrors, and other parts which guide the light received from light collection part 121 to light modulation device 130.

Light modulation device 130 modulates the light from light-incident part 120 based on image information so as to form a desired optical image. Light modulation device 130 includes DMDs 131-133 corresponding to red, green, and blue, respectively, as modulation colors. Light modulation device 130 further includes prism 134 for guiding the light from light-incident part 120 to DMDs 131-133 by splitting the light into predetermined wavelength ranges corresponding to DMDs 131-133. Prism 134 also guides the light modulated by DMDs 131-133 to projection lens 20.

The desired optical image formed by the light modulation of DMDs 131-133 passes through projection lens 20 (see FIG. 1) and is projected on a screen or other similar devices in an enlarged scale. DMDs 131-133 generate heat because of their function, or in other words, DMDs 131-133 are heating elements. In the present embodiment, sirocco fans 140-142 are oriented to DMDs 131-133 so as to cool them. Sirocco fans 140-142 are screwed into hermetic housing 110 via fixing plate 143.

Figure 6:
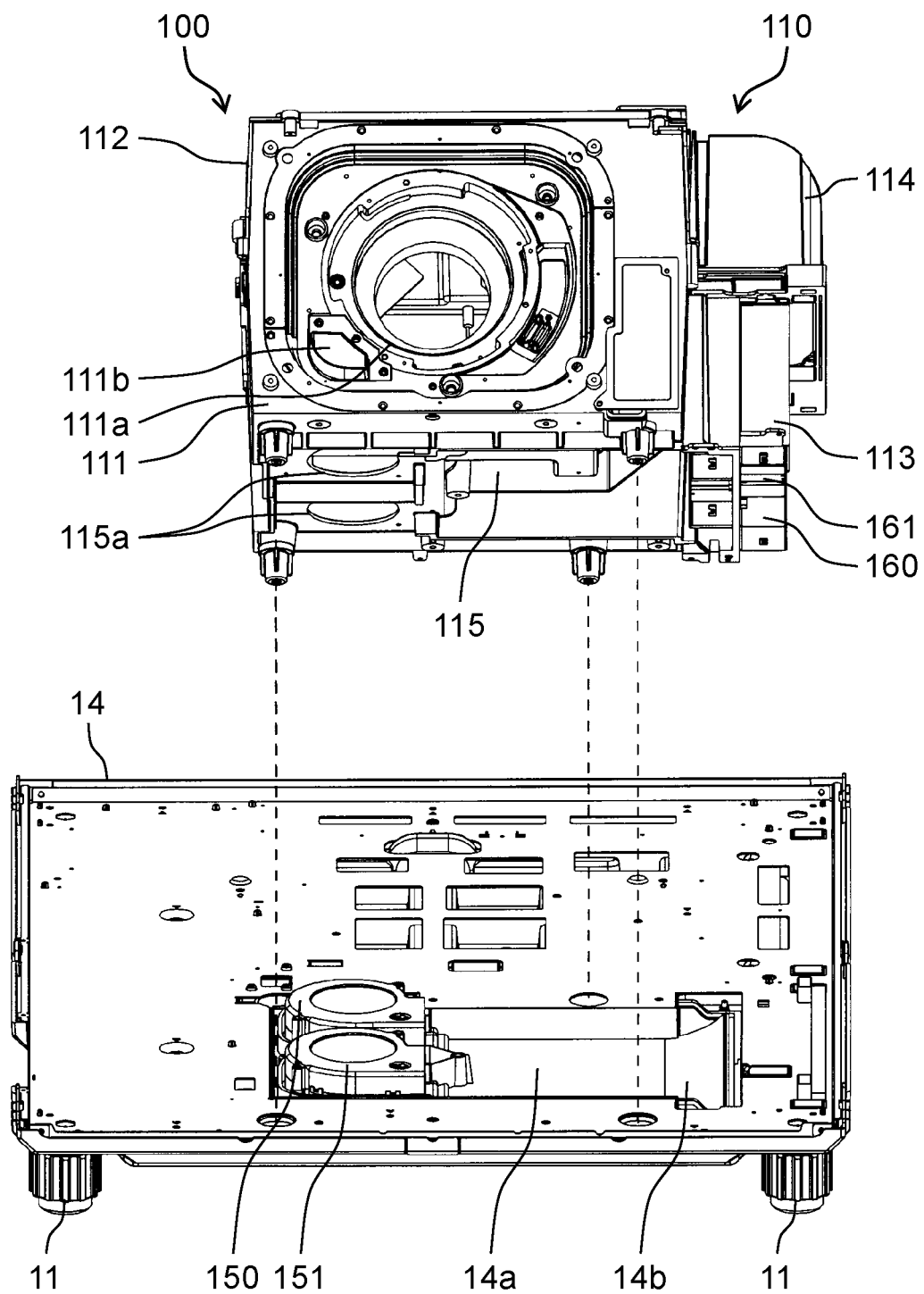
FIG. 6 is a partially exploded view of the hermetic housing and the lower panel shown in FIG. 2, which are aligned with each other.

FIG. 6 is a partially exploded view of hermetic housing 110 and lower panel 14 shown in FIG. 2, which are aligned with each other. In FIG. 6, hermetic housing 110 and projector housing 10 are in an exploded state. Bottom mount case 111 includes air guide wall 115 as its false bottom. Air guide wall 115 partitions the sealed space of hermetic housing 110 into two regions although not completely. To be more specific, hermetic housing 110 is partitioned into a main space S1 and an air guide passage S2. The main space S1 contains light modulation device 130 as a heating element and other main optical components. The air guide passage S2 is located below the main space S1 and functions as a radiating air passage (see FIGS. 9 and 11). In the present embodiment, the sealed space in hermetic housing 110 is partitioned into two regions, but can alternatively be partitioned into three or more regions. The main space S1 is defined by bottom mount case 111, top mount case 112, and air guide wall 115. The air guide passage S2 is defined by bottom mount case 111, lower panel 14, fan case 113, heat exchanger case 114, and air guide wall 115 as will be described later. In order to form the air guide passage S2, lower panel 14 has recess 14a shaped in conformance with bottom mount case 111, and curved surface 14b for directing airflow upward. Thus, the air guide passage S2 in the present embodiment is curved in an L shape. Air guide wall 115 has two circular openings 115a which provide fluidic communication between the main space S1 and the air guide passage S2. Openings 115a are formed as the inlet of the air guide passage S2 in terms of airflow. The inlet is located near the lateral part on the opposite side of bottom mount case 111 from the lateral part adjoining heat exchanger case 114 when seen from the front. The inlet is equipped with the air inlet port of two sirocco fans 150 and 151 (first sirocco fans), so that sirocco fans 150 and 151 introduce the air in the main space S1 into the air guide passage S2. Sirocco fans 150 and 151 then guide the air in the passage S2 to communication part 115b (see FIG. 9), which will be described later. In FIG. 6, sirocco fans 150 and 151 are placed on lower panel 14 for easier explanation of openings 115a. In fact, however, sirocco fans 150 and 151 are screwed into air guide wall 115.

Figure 7:
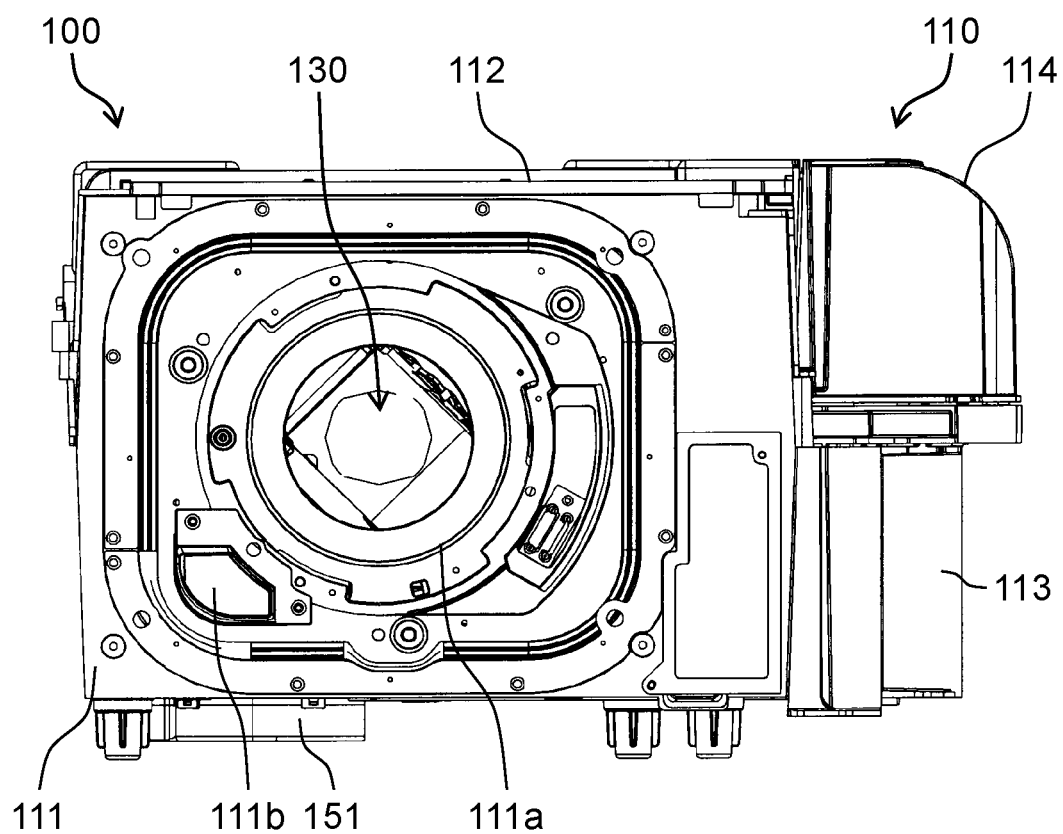
FIG. 7 is a front view of the optical unit shown in FIG. 2.
Figure 8:
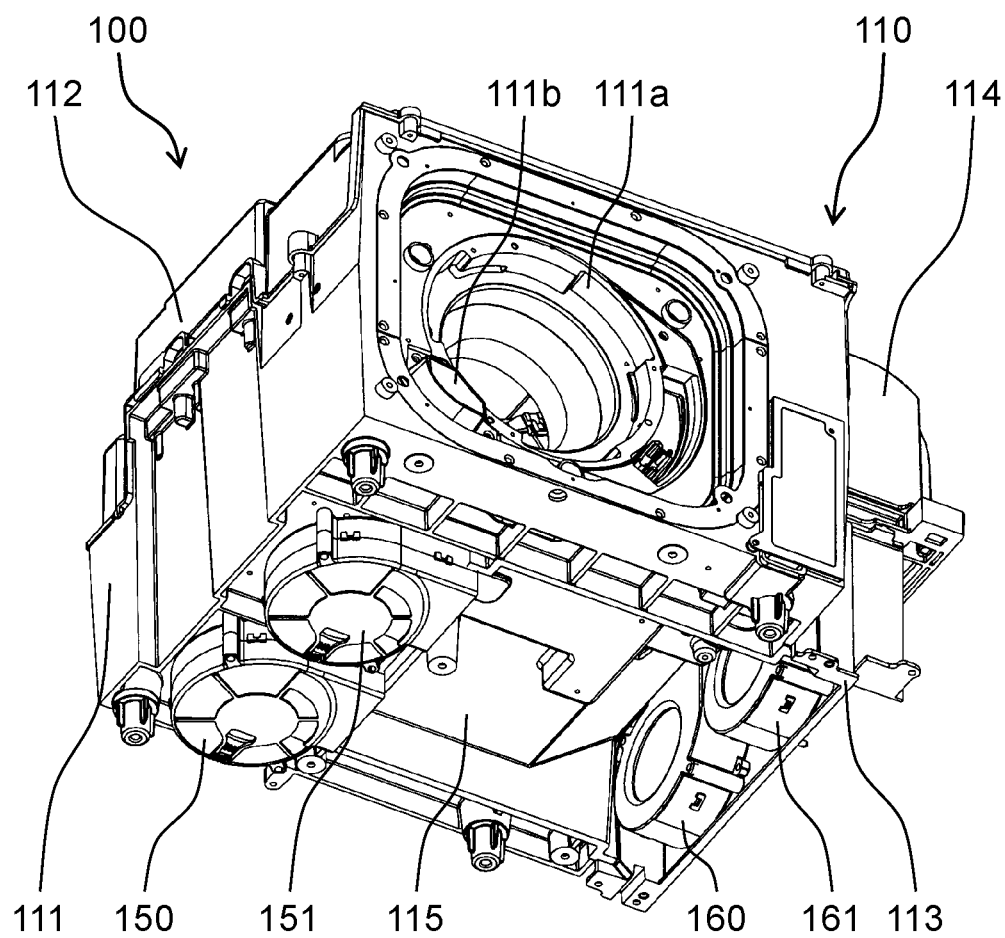
FIG. 8 is a perspective view of the optical unit shown in FIG. 2 seen from below.
Figure 9:
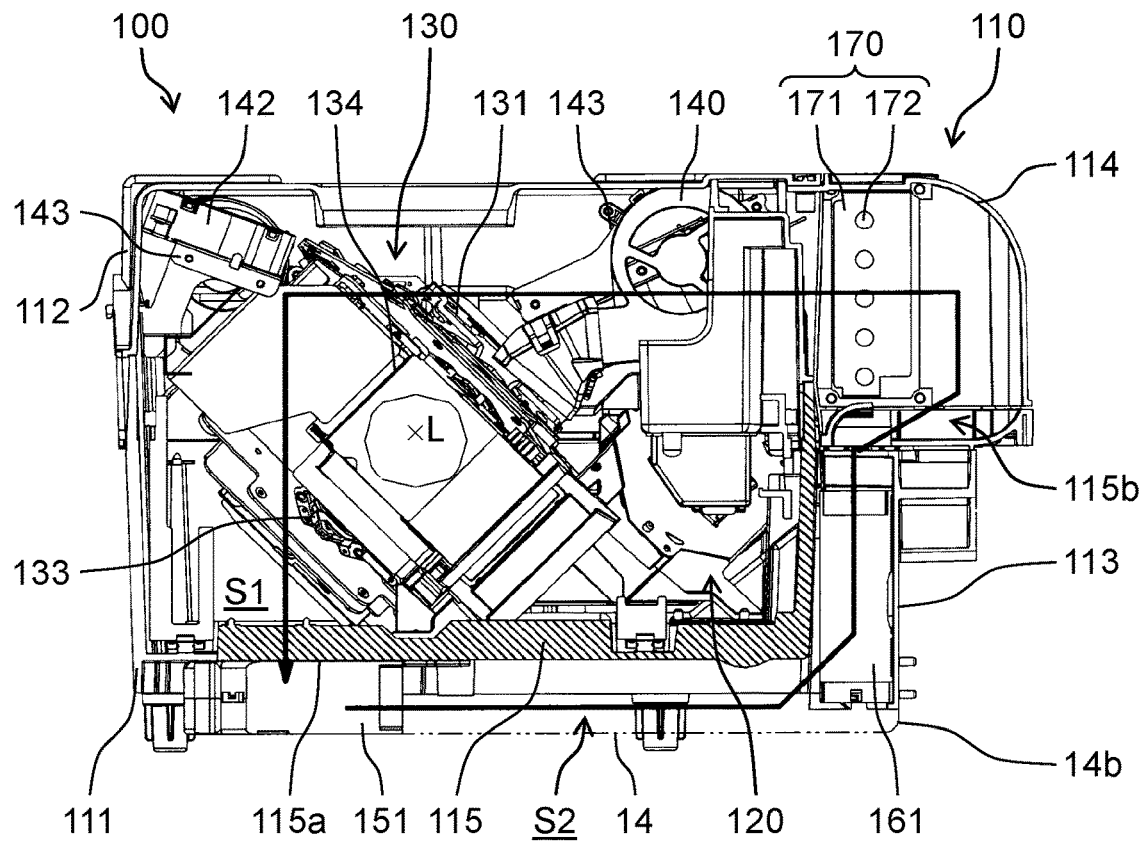
FIG. 9 is a sectional view of the optical unit shown in FIG. 2 seen from the front.

FIG. 7 is a front view of optical unit 100. FIG. 8 is a perspective view of unit 100 seen from below. FIG. 9 is a sectional view of unit 100 seen from the front. In the sectional view of FIG. 9, for a better understanding of the drawing, air guide wall 115 alone are shown with a hatch pattern, and the other components are not hatched. As seen in FIGS. 7 to 9, two sirocco fans 150 and 151 (first sirocco fans) are located below air guide wall 115. Air guide wall 115 extends along the bottom surface of hermetic housing 110 and also extends to heat exchanger (heat absorption part) 170 housed in heat exchanger case 114. Thus, air guide wall 115 is formed in an L shape. As a result, air guide passage S2 is also formed in an L shape. Air guide wall 115 includes communication part 115b adjoining heat exchanger 170 and providing communication between the air guide passage S2 and the main space S1. Communication part 115b is oriented to heat exchanger 170. In other words, communication part 115b is the outlet of the air guide passage S2. In the communication part 115b functioning as the outlet, two sirocco fans 160 and 161 (second sirocco fans) housed in fan case 113 are oriented to heat exchanger 170. The air in the air guide passage S2 is blown by sirocco fans 150-151 and 160-161 to heat exchanger 170 through communication part 115b.

As shown in FIG. 5, heat exchanger 170 includes a plurality of rectangular plate fins 171 made of metal and arranged in parallel, and a plurality of liquid-cooling pipes 172 penetrating the middle portions of fins 171. In heat exchanger 170, a liquid refrigerant is circulated through liquid-cooling pipes 172. The refrigerant running through liquid-cooling pipes 172 cools the air that is passing through fins 171. Heat exchanger 170 is located partly inside and partly outside hermetic housing 110. As a result, the heat in hermetic housing 110 is absorbed by the part of heat exchanger 170 that is located inside housing 110. The absorbed heat is conveyed through heat exchanger 170 and is radiated from the part of heat exchanger 170 that is exposed from housing 110.

When seen along the optical axis L of projection lens 20 (see FIG. 1) as shown in FIG. 9, sirocco fans 150 and 151 are located opposite to heat exchanger 170 with respect to light modulation device 130 (i.e., the heating element). This arrangement forms the air circulation system shown by the arrow in FIG. 9, which will be described later. In other words, the air in hermetic housing 110 guided by sirocco fans 150 and 151 is circulated around the optical axis L.

In the present embodiment, control device 30 takes control of sirocco fans 140-142,150-151, and 160-161. Control device 30 is composed of hardware including a central processing unit (CPU) and storage devices such as random access memory (RAM) and read only memory (ROM), and software run on the hardware.

Figure 10:
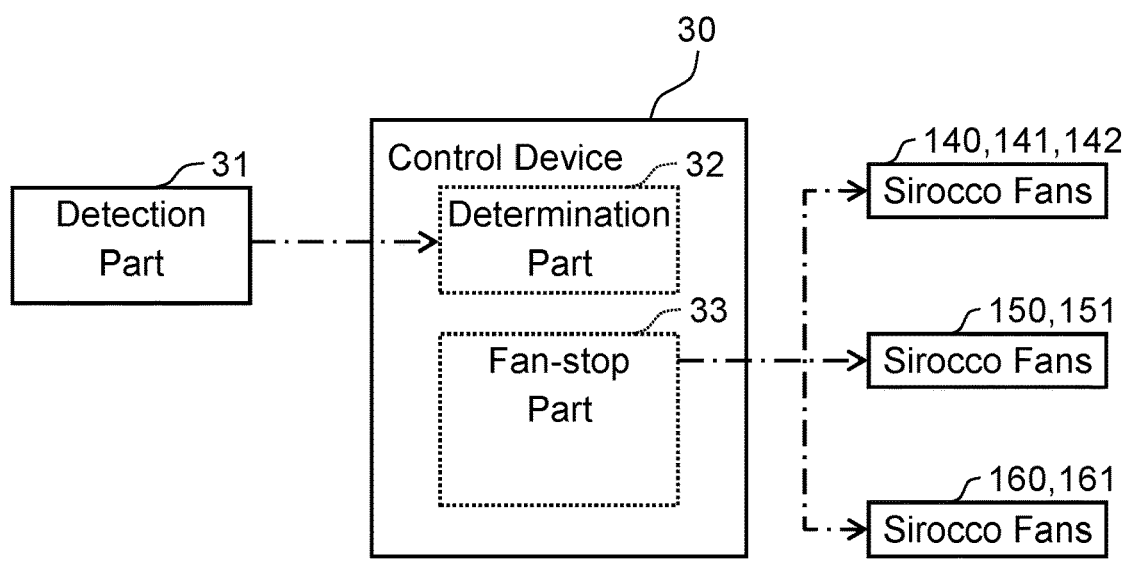
FIG. 10 is a block diagram of the control of the control device.

FIG. 10 is a block diagram of the control of control device 30. As conceptually shown in FIG. 10, projector 1 includes detection part 31 for detecting the attachment state of projection lens 20. Detection part 31 is a sensor for detecting the attachment state of projection lens 20 mechanically or electrically. Control device 30 includes determination part 32 and fan-stop part 33. Determination part 32 determines whether or not the attachment state detected by detection part 31 indicates that projection lens 20 is in a detached state. Fan-stop part 33 stops sirocco fans 140-142, 150-151, and 160-161 when determination part 32 has determined that projection lens 20 is in a detached state. This configuration allows projector 1 to stop sirocco fans 140-142, 150-151, and 160-161 whenever necessary so as to be dust-proof as will be described later.

2. Operation

The operation of projector 1 structured as above will be described as follows. Note that the projecting operation of projector 1 is the same as that of general DLP projectors, and thus its description will be omitted. The following description will be focused on the radiating and controlling operations of projector 1.

2-1. Radiating Operation

Figure 11:
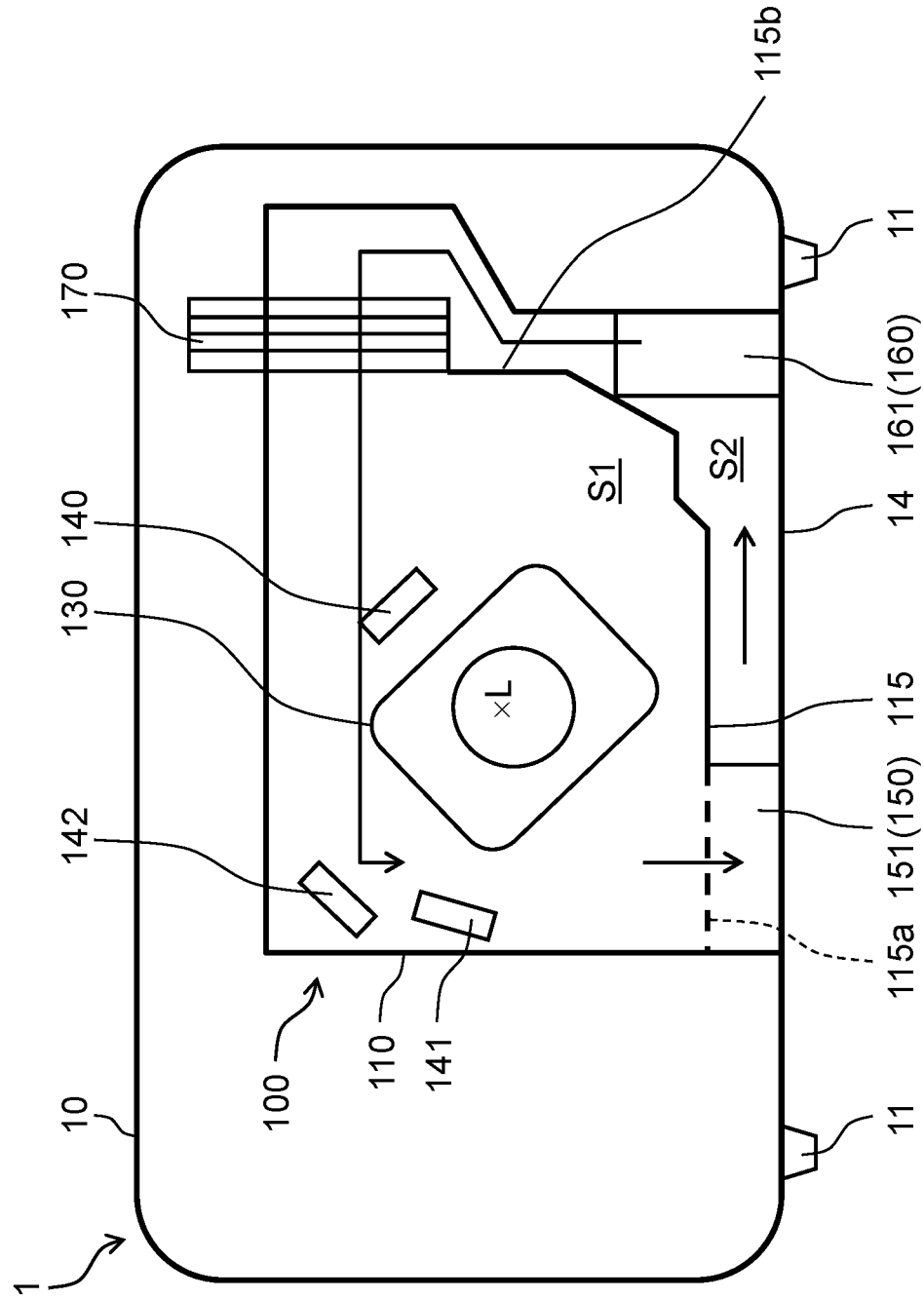
FIG. 11 is a schematic diagram of the structure shown in FIG. 9.

FIG. 11 is a schematic diagram of the structure shown in FIG. 9. With reference to FIGS. 9 and 11 together, the flow of air (see the arrows) will be described as follows. Air is introduced by sirocco fans 150 and 151 from the main space S1 into the air guide passage S2 through openings 115a functioning the inlet of the air guide passage S2. The air introduced to air guide passage S2 is guided by sirocco fans 150-151 and 160-161 from the inlet toward communication part 115b functioning as the outlet. The air guided to the outlet is blown by sirocco fans 150-151 and 160-161 to heat exchanger 170, passes through heat exchanger 170 and the vicinity of light modulation device 130 (the heating element), and returns to openings 115a. In this manner, in hermetic housing 110 of projector 1 according to the present embodiment, air is circulated around the optical axis L.

The present embodiment adopts sirocco fans because they have sufficient static pressure to circulate air inside the sealed space of hermetic housing 110. As long as this condition is satisfied, sirocco fans 140-142 used to directly cool DMDs 131-133 can be made more compact and lower in static pressure than sirocco fans 150-151 and 160-161 used for air circulation. Sirocco fans 150-151 and 160-161 used for air circulation do not have to be different in static pressures from each other and can be identical fans.

2-2. Controlling Operation

As shown in FIG. 10, projector 1 according to the present embodiment allows detection part 31 to detect the attachment state of projection lens 20. Upon receiving information from detection part 31, projector 1 allows determination part 32 of control device 30 to determine whether projection lens 20 is in the detached state. If lens 20 is determined to be in the detached state, fan-stop part 33 of control device 30 stops sirocco fans 140-142,150-151, and 160-161. This configuration prevents sirocco fans 140-142,150-151, and 160-161 from drawing dust into hermetic housing 110 when lens 20 is detached. Although it is preferable to stop all of sirocco fans 140-142, 150-151, and 160-161 as in the present embodiment, it is alternatively possible to stop only some of them.

3. Effects

As described so far, projector 1 according to the present embodiment includes light modulation device 130, projection lens 20, hermetic housing 110, projector housing 10, heat exchanger 170, air guide wall 115, and sirocco fans 150 and 151. Projection lens 20 is configured to project light from light modulation device 130. Hermetic housing 110 hermetically houses light modulation device 130. Projector housing 10 contains hermetic housing 110. Heat exchanger 170 (an example of the heat absorption part) is located at the upper section of hermetic housing 110 and is configured to absorb heat received from hermetic housing 110 and to radiate the heat to the outside of hermetic housing 110. Air guide wall 115 is located in hermetic housing 110 and partitions the air guide passage S2, which extends along the bottom surface of hermetic housing 110, from the main space S1 containing light modulation device 130. Air guide wall 115 includes communication part 115b and openings 115a. Communication part 115b adjoins heat exchanger 170 and provides communication between the air guide passage S2 and the main space S1. Openings 115a function as an inlet for guiding air from the main space S1 into the air guide passage S2 after the air has passed through heat exchanger 170. Sirocco fans 150 and 151 (first sirocco fans) are located at the inlet and are configured to introduce the air in the main space S1 into the air guide passage S2, to guide the air in the air guide passage S2 to communication part 115b, and to blow the air from communication part 115b to heat exchanger 170.

Thus, light modulation device 130, which is to be protected from dust, is sealed with hermetic housing 110 and is thus rendered dust-proof. Furthermore, the components in hermetic housing 110 are properly arranged to improve radiation performance, thereby allowing projector 1 to be minimized. To be more specific, the air guide passage S2 is defined by air guide wall 115 and extends along the bottom surface of hermetic housing 110. This arrangement creates rectified airflow at the bottom of housing 110, enabling more efficient release of heat from the bottom surface of housing 110 to the outside of housing 110. Furthermore, the air in the main space S1 can be heated to a high temperature because of containing light modulation device 130 as the heating element. This air is introduced by sirocco fans 150 and 151 into the air guide passage S2, fed through the air guide passage S2 to heat exchanger 170, absorbed by heat exchanger 170, and radiated to the outside of housing 110. In this manner, the air inside hermetic housing 110 is effectively cooled to improve radiation performance.

According to an aspect of the present disclosure, in projector 1, when seen along the optical axis L of projection lens 20, sirocco fans 150 and 151 are located opposite to heat exchanger 170 with respect to light modulation device 130.

This configuration allows hermetic housing 110 to have a longer distance of airflow between sirocco fans 150, 151 and heat exchanger 170. As a result, air can be circulated throughout hermetic housing 110, thereby further improving the radiation performance of projector 1.

According to another aspect of the present disclosure, in projector 1, sirocco fans 150 and 151 are located at the first lateral part of hermetic housing 110, heat exchanger 170 is located at the second lateral part, which is on the opposite side of hermetic housing 110 from the first lateral part, and projection lens 20 is located so that the optical axis L is located between the first lateral part and the second lateral part. This configuration enables the air in hermetic housing 110 guided by sirocco fans 150 and 151 to be circulated around the optical axis L.

Heat exchanger 170, which is located in heat exchanger case 114 at the lateral part of hermetic housing 110, can radiate heat from the side surface of housing 110 to the outside of housing 110. Furthermore, sirocco fans 150 and 151 are located at the lateral part of housing 110 opposite to heat exchanger case 114. This configuration increases the distance of airflow between sirocco fans 150, 151 and heat exchanger 170 as mentioned above so as to cool the entire hermetic housing 110. In addition, projection lens 20 is located so that the optical axis L is located between the two lateral parts, and the air is circulated around the optical axis L in hermetic housing 110. In projector 1, many optical components may be located along the optical axis L of projection lens 20. In this case, the cooling mechanism including heat exchanger 170 and sirocco fans 150, 151 can be located at each lateral part outside the region where these optical components are located. This configuration can reduce the influence of the cooling mechanism on the optical components.

According to another aspect of the present disclosure, in projector 1, projector housing 10 and hermetic housing 110 share the bottom surface.

When these housings 10 and 110 share the bottom surface, the radiation from the bottom surface of hermetic housing 110 (i.e., the bottom surface of projector housing 10) results in the radiation from projector 1 to the outside. This improves the radiation performance of projector 1.

According to another aspect of the present disclosure, projector 1 includes sirocco fans 160 and 161 (second sirocco fans), which are located in communication part 115b and oriented to heat exchanger 170.

Sirocco fans 160 and 161 ensures the flow of air from communication part 115b to heat exchanger 170. This configuration further improves the radiation performance of projector 1.

According to another aspect of the present disclosure, projector 1 further includes sirocco fans 140-142 (third sirocco fans), which are oriented to light modulation device 130.

Sirocco fans 140-142 are provided to directly cool light modulation device 130, which is the heating element, so as to further improve the radiation performance of projector 1.

According to another aspect of the present disclosure, projector 1 further includes detection part 31 for detecting the attachment state of detachable projection lens 20 and a control device. The control device includes determination part 32 for determining whether or not the attachment state detected by detection part 31 indicates that projection lens 20 is in a detached state, and fan-stop part 33 for stopping sirocco fans 150 and 151 when determination part 32 has determined that projection lens 20 is in the detached state.

Assume that detection part 31 detects the attachment state of projection lens 20, and determination part 32 of control device 30 has determined that the attachment state indicates that projection lens 20 is in the detached state. In this case, fan-stop part 33 of control device 30 stops sirocco fans 140-142,150-151, and 160-161. This configuration prevents sirocco fans 140-142,150-151, and 160-161 from drawing dust into hermetic housing 110 when projection lens 20 is detached. Although it is preferable to stop all of sirocco fans 140-142,150-151, and 160-161 as in the present embodiment, it is alternatively possible to stop only some of them.

Other Embodiments

The first embodiment has been thus described as an example technique of the present disclosure. However, the technique of the present disclosure is not limited to this embodiment and can be applied to other embodiments obtained by modification, replacement, addition, omission, etc. Furthermore, the components described in the first embodiment may be combined to form additional embodiments. Examples of such additional embodiments will now be described.

Figure 12:
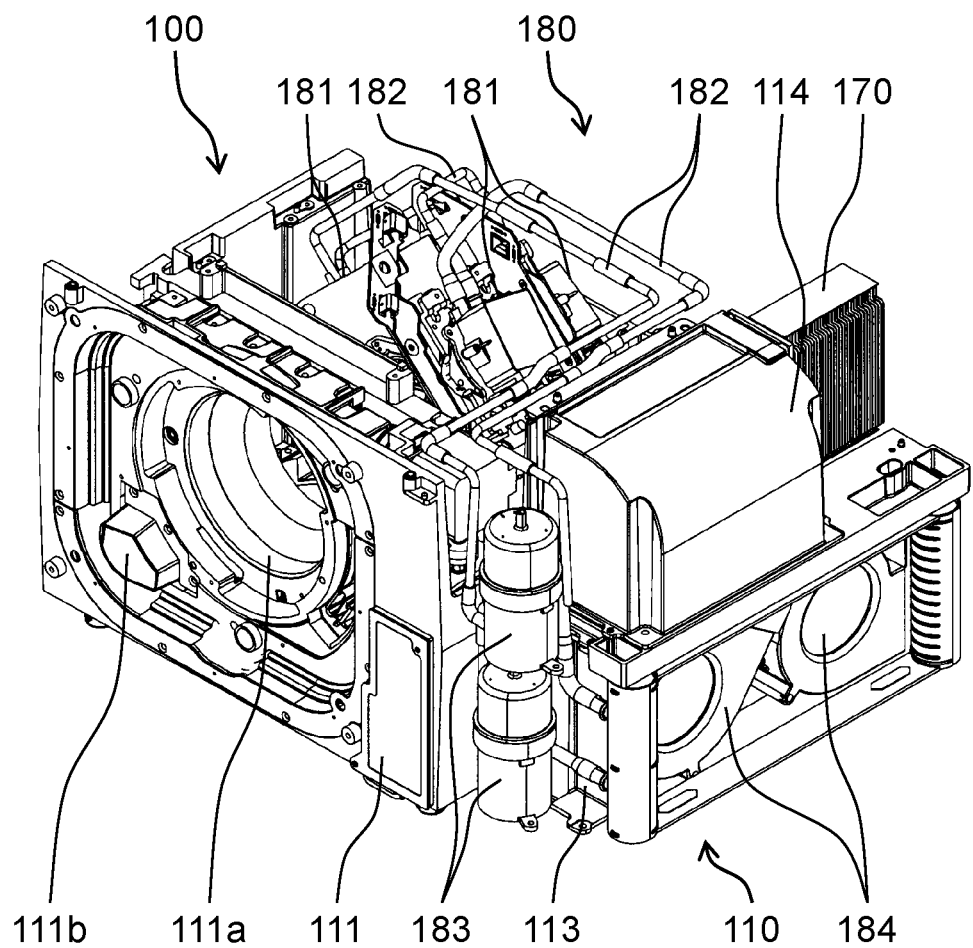
FIG. 12 is a perspective view of the additional cooling mechanism of a projector according to another embodiment.

According to another embodiment shown in FIG. 12, if the radiation performance of projector 1 of the first embodiment is not sufficient, additional cooling mechanism 180 is added to the structure of the first embodiment. Additional cooling mechanism 180 is used to cool DMDs 131-133 more efficiently. Mechanism 180 includes cooling pads 181 for cooling DMDs 131-133, refrigerant pipe 182 for supplying a refrigerant to cooling pads 181, refrigerant tanks 183 for keeping the refrigerant, and sirocco fans 184 for cooing heat exchanger 170 and the refrigerant. Cooling pads 181 are attached to DMDs 131-133. Two refrigerant tanks 183 are cylindrical and placed one above the other at the lateral side of fan case 113 and heat exchanger case 114. Two sirocco fans 184 are located outside fan case 113; one is oriented to heat exchanger 170 and the other is oriented to the back. In other words, refrigerant tanks 183 and sirocco fans 184 are located outside hermetic housing 110.

After being cooled by sirocco fans 184, the refrigerant is supplied through refrigerant pipe 182 to cooling pads 181, thereby cooling DMDs 131-133. The refrigerant is then supplied through refrigerant pipe 182 to refrigerant tanks 183 and kept there, thereby being again cooled by sirocco fans 184. The refrigerant can be thus circulated to cool DMDs 131-133.

According to still another embodiment, if the radiation performance of projector 1 of the first embodiment is too high, either sirocco fans 140-142 or sirocco fans 160 and 161 can be omitted in the first embodiment. This can further miniaturize projector 1.

According to still another embodiment, the technique of the present disclosure can also be applied to other than DLP projectors, such as liquid crystal display (LCD) projectors or liquid crystal on silicon (LCoS) projectors.

These embodiments have been described as example techniques of the present disclosure with the accompanying drawings and detailed explanation.

Note that some of the components shown in the accompanying drawings and described in detail are not essential to solve the above-mentioned problems but are given only to exemplify the technique of the present disclosure. Therefore, these components should not be regarded as essential just because they are shown in the accompanying drawings and described in detail.

Furthermore, these embodiments are example techniques of the present disclosure, and can be subject to modification, replacement, addition, omission, etc. within the scope of claims and their equivalents.

The present disclosure is applicable to projectors.

What is claimed is:

1. A projector comprising:
   a light modulation device;
   a projection lens configured to project light received from the light modulation device;
   a hermetic housing hermetically housing the light modulation device;
   a projector housing containing the hermetic housing;
   a heat absorption part located at an upper section of the hermetic housing, the heat absorption part being configured to absorb heat from the hermetic housing and to radiate the heat to an outside of the hermetic housing;
   an air guide wall being located in the hermetic housing and partitioning an air guide passage in the hermetic housing from a main space containing the light modulation device, the air guide passage extending along a bottom surface of the hermetic housing, and the air guide wall comprising:
      a communication part configured to adjoin the heat absorption part and provide communication between the air guide passage and the main space, and
      an opening configured to function as an inlet for guiding air from the main space into the air guide passage after the air has passed through the heat absorption part; and
   a first fan located at the inlet in the hermetic housing, the first fan being configured to introduce the air in the main space into the air guide passage, to guide the air in the air guide passage to the communication part, and to blow the air from the communication part to the heat absorption part.

2. The projector according to claim 1, wherein, when seen along an optical axis of the projection lens, the first fan is located opposite to the heat absorption part with respect to the light modulation device.

3. The projector according to claim 1, wherein:
   the first fan is located at a first lateral part of the hermetic housing;
   the heat absorption part is located at a second lateral part of the hermetic housing on an opposite side of the hermetic housing from the first lateral part of the hermetic housing; and
   the projection lens is located so that an optical axis of the projection lens is located between the first lateral part of the hermetic housing and the second lateral part of the hermetic housing such that air in the hermetic housing guided by the first fan can be circulated around the optical axis of the projection lens.

4. The projector according to claim 1, wherein the projector housing and the hermetic housing share the bottom surface.

5. The projector according to claim 1, further comprising a second fan located in the communication part and oriented to the heat absorption part.

6. The projector according to claim 1, further comprising a third fan oriented to the light modulation device.

7. The projector according to claim 1, wherein the projection lens is detachable, and the projector further comprises:
   a detection part configured to detect an attachment state of the projection lens; and
   a control device comprising:
      a determination part configured to determine whether or not the attachment state detected by the detection part indicates that the projection lens is in a detached state; and
      a fan-stop part configured to stop the first fan when the determination part has determined that the projection lens is in the detached state.

8. The projector according to claim 1, wherein the first fan is a sirocco fan.

9. The projector according to claim 5, wherein the second fan is a sirocco fan.

10. The projector according to claim 6, wherein the third fan is a sirocco fan.

\* \* \* \* \*